Patented Apr. 25, 1950

2,505,284

UNITED STATES PATENT OFFICE 2,505,284

WOOL DYESTUFFS

Harold France and Norman Hulton Haddock, Blackley, England, assignors to Imperial Chemical Industries Limited, a corporation of Great Britain No Drawing. Application July 13, 1948, Serial No. 38,565. In Great Britain July 16, 1947

2 Claims. (Cl. 260—335)

This invention relates to new wool dyestuffs and more particularly it relates to new wool dyestuffs of the xanthene series.

It is known to manufacture acid wool dyestuffs by sulfonating the basic dyestuffs obtained by condensing 3:6-dichlorofluoran with aromatic amines such as for example aniline, toluidine, xylidine and naphthylamine. It has not however hitherto been known to use for the condensation with 3:6-dichlorofluoran, those aromatic amines which contain cyclohexyl groups attached to the aromatic nucleus, and it has not hitherto been known to sulphonate the basic dyestuffs which may be obtained in this way. We have now found that when the basic dyestuffs which may be made in this way, are sulfonated, acid wool dyestuffs are obtained which are superior in fastness to wet treatments and in general are superior in clarity of shade to known acid wool dyestuffs of the xanthene series.

According to our invention therefore we provide a process for the manufacture of new wool dyestuffs of the xanthene series which comprises sulphonating 3:6-di-(o- or p-cyclohexylanilino)-fluorans which may contain methyl groups in the o- and/or p-positions of the anilino residues which are not occupied by cyclohexyl groups.

The new dyestuffs in their acid form may be represented by the formula

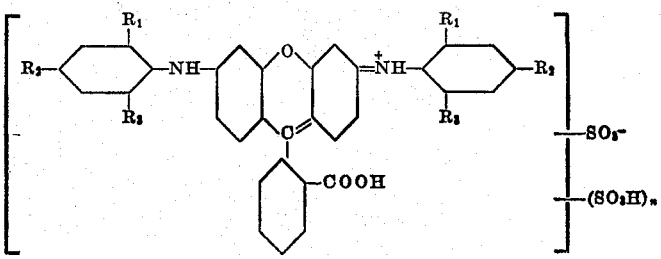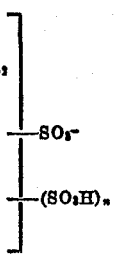

where $n$ is zero or a positive integer and one of the groups $R_1$, $R_2$, and $R_3$ represent cyclohexyl and the others represent methyl groups or hydrogen atoms.

As suitable substituted fluorans for use in the process there may be mentioned for example 3:6-di-(2-cyclohexyl-anilino)-fluoran, 3:6-di-(4-cyclohexylanilino)-fluoran, 3:6-di-(2'-cyclohexyl-4'-methyl-anilino)-fluoran (which may be obtained from 3:6-dichlorofluoran and 3-cyclohexyl-p-toluidine), 3:6-di-(2'-methyl-6'-cyclohexyl-anilino)-fluoran (which may be obtained from 3:6-dichlorofluoran and 3-cyclohexyl-o-toluidine) and 3:6 - di - (2':4' - dimethyl-6'-cyclohexyl-anilino)-fluoran (which may be obtained from 3:6-dichlorofluoran and 5-cyclohexyl-m-4-xylidine).

The sulphonation may be carried out by treating the substituted fluoran in the form of a free base or a salt for example the hydrochloride, or the zinc chloride double salt thereof, with sulphuric acid or with oleum until a test portion of the sulphonation mixture is soluble in dilute aqueous ammonia solution. The dyestuff then contains about 1 or between 1 and 2 sulphonic acid groups per molecule. The product may be isolated by pouring the sulphonation mixture onto ice and filtering off the precipitated dyestuff. If required the dyestuff may be purified by dissolving it in dilute alkali and reprecipitating it with acid. If desired the sulphonation can be carried further to obtain dyestuffs containing 2 or more sulphonic acid groups per molecule.

The invention is illustrated but not limited by the following examples in which the parts are by weight.

Example 1

6.3 parts of anhydrous zinc chloride are added to a stirred mixture of 11.1 parts of 3:6-dichlorofluoran, 1.8 parts of powdered lime and 15.8 parts of 2-cyclo-hexylaniline which is heated in an oil bath at 100° C. The mixture is then heated at 210–215° C. and maintained at this temperature for 2 hours. The mixture is cooled, powdered and extracted with cold dilute hydrochloric acid to remove inorganic salts and excess amine, and the insoluble basic dyestuff is thus obtained as a bronze-iridescent, red-violet powder.

12.0 parts of the basic dyestuff so obtained are added to 80 parts of sulphuric acid at 20° C. and the mixture is stirred until a test portion of the sulphonation mixture is soluble in dilute aqueous ammonia. The mixture is poured on to 250 parts of ice and the precipitate, so obtained, is filtered off. The dyestuff so obtained is dissolved in hot dilute sodium carbonate solution and reprecipitated by adding hydrochloric acid. It is filtered off and dried when a purple powder is obtained. The dyestuff so obtained, which contains about 1 sulphonic acid group per molecule, dyes wool in red-violet shades of unusual brilliance and clarity.

*Example 2*

Instead of the 15.8 parts of 2-cyclohexylaniline used in Example 1 there are used 15.8 parts of 4-cyclohexylaniline. The dyestuff so obtained is a deep bluish-purple powder which dyes wool in clear blue-violet shades.

*Example 3*

15.0 parts of the basic xanthene dyestuff obtained by condensing one molecular proportion of 3:6-dichlorofluoran with 2 molecular proportions of 3-cyclohexyl-p-toluidine are sulphonated by stirring in 100 parts of 100% sulphuric acid at 25° C. until a test portion of the sulphonation mixture is soluble in dilute ammonia solution. The dyestuff is isolated as described in Example 1 as a purple powder. The product dyes wool in reddish-violet shades.

*Example 4*

7.5 parts of the basic xanthene dyestuff obtained by condensing 3:6-dichlorofluoran with 3-cyclohexyl-o-toluidine are sulphonated by stirring with 60 parts of 100% sulphuric acid at 22° C. until a test portion of the sulphonation mixture is soluble in dilute ammonia solution. The dyestuff is isolated as described in Example 1 as a red powder. The product dyes wool in bright bluish-red shades.

*Example 5*

8.7 parts of the basic xanthene dyestuff obtained by condensing 3:6-dichlorofluoran with 5-cyclohexyl-m-4-xylidine are dissolved in 60 parts of 100% sulphuric acid below 18° C. 20% oleum is then added portionwise at 10–15 minute intervals to the stirred reaction mixture at 17–18° C. until a test portion of the mixture dissolves in dilute ammonia solution. The dyestuff is isolated as a red powder as described in Example 1. The product dyes wool in bluish-red shades.

We claim:

1. Process for the manufacture of a new wool dyestuff which comprises sulphonating 3:6-di-(o-cyclohexylanilino)fluoran.

2. A new dyestuff of the formula

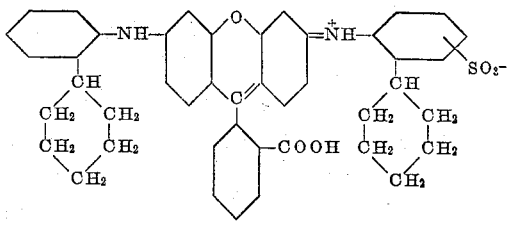

HAROLD FRANCE.
NORMAN HULTON HADDOCK.

REFERENCES CITED

The following references are of record in the file of this patent:

UNITED STATES PATENTS

| Number | Name | Date |
|---|---|---|
| 2,153,059 | Eckert et al. | Apr. 4, 1939 |